(12) United States Patent
Huang et al.

(10) Patent No.: US 8,958,804 B2
(45) Date of Patent: Feb. 17, 2015

(54) COMMUNICATION SYSTEM AND COMMUNICATING CONNECTION METHOD THEREOF

(75) Inventors: Nen-Fu Huang, Hsinchu (TW); Wei-Kuan Shih, Hsinchu (TW)

(73) Assignees: Wei-Kuan Shih, Hsinchu (TW); Nen-Fu Huang, Hsinchu (TW)

( * ) Notice: Subject to any disclaimer, the term of this patent is extended or adjusted under 35 U.S.C. 154(b) by 254 days.

(21) Appl. No.: 13/427,364

(22) Filed: Mar. 22, 2012

(65) Prior Publication Data

US 2013/0109366 A1 May 2, 2013

(30) Foreign Application Priority Data

Oct. 31, 2011 (TW) ............... 100139668 A

(51) Int. Cl.
| | |
|---|---|
| H04W 36/00 | (2009.01) |
| H04L 29/08 | (2006.01) |
| H04M 7/00 | (2006.01) |
| H04L 29/06 | (2006.01) |
| H04L 29/12 | (2006.01) |

(52) U.S. Cl.
CPC ............. H04L 67/12 (2013.01); H04M 7/0039 (2013.01); H04M 7/0063 (2013.01); H04M 2207/182 (2013.01); H04L 61/1547 (2013.01); H04L 65/1069 (2013.01)
USPC ........ 455/444; 455/417; 455/436; 455/456.1; 455/456.3

(58) Field of Classification Search
CPC ... H04M 3/54; H04M 3/543; H04M 3/42348; H04M 3/42
USPC ...................... 455/416, 417, 456.1–457, 445; 379/211.02
See application file for complete search history.

(56) References Cited

U.S. PATENT DOCUMENTS

| | | | | |
|---|---|---|---|---|
| 2005/0003857 A1* | 1/2005 | Sylvain | ...................... | 455/554.1 |
| 2006/0142011 A1* | 6/2006 | Kallio | ........................... | 455/445 |
| 2007/0287438 A1* | 12/2007 | Hansen et al. | ................ | 455/417 |
| 2008/0080486 A1* | 4/2008 | Kim et al. | ..................... | 370/352 |

* cited by examiner

*Primary Examiner* — Marcos Torres
(74) *Attorney, Agent, or Firm* — Saliwanchik, Lloyd & Eisenschenk

(57) ABSTRACT

A communication system and a communicating connection method are disclosed. The communication system comprises a first user side, a second user side and a cloud platform. The first user side has a first identity identification code, a first space identification code or a combination thereof. The second user side has a second identity identification code, a second space identification code or combination thereof. The cloud platform comprises a cloud database and a cloud processing module. When the first user side is positioned, the cloud processing module matches and establishes the first user side and the second identity identification code, the second space identification code or the combination thereof, to connect the first user side and the second user side by a VoIP technology.

18 Claims, 5 Drawing Sheets

COMMUNICATION SYSTEM AND COMMUNICATING CONNECTION METHOD THEREOF

CROSS-REFERENCE TO RELATED APPLICATION

This application claims the benefit under 35 U.S.C. §119 of Taiwan Patent Application No. 100139668, filed Oct. 31, 2011, which is hereby incorporated by reference in its entirety.

BACKGROUND

1. Field of the Invention

The present invention relates to a communication system and a communicating connection method thereof, in more particularly to the communication system and the communicating connection method thereof for using a cloud platform to audio-connect two-way to multi-way communication.

2. Description of the Related Art

Many people frequently use mobile phones to make calls in indoor space, and the foregoing reason includes:
1. The mobile phone is easily portable and therefore convenient to use.
2. The mobile phone stores phone books which allow users to quickly find out contact person data. Since all people phone numbers are not easily remembered. Using the mobile phone to find contact person data and dial phone numbers is convenience.
3. Wherever the users are, the mobile phone can be answered and dialed any time.

Although the mobile phone may have the foregoing advantages, it still has defects as the following:
1. When the user is in an indoor environment, the user must walk around to find a location with stronger signals due to weaker indoor signals and poor communication quality.
2. Electromagnetic wave generated by the mobile phone may harm human bodies. When the communication quality becomes poor, signals have to be boosted up to maintain the quality, which would lead to the issue of strong electromagnetic waves.
3. Heavy users of the mobile phone would suffer form the cost of the bill.

In another word, the user may have many concerns, such as dangerous electromagnetic wave, clear communication quality, communication expense or mobility, while using the mobile phone to make calls.

Recently, communication software, such as Skype, MSN, and the like, has the advantage of saving expenses and is widely applied to corporations or personal users. Its applied technique is VoIP (Voice over IP) that transmits audio data through IP networks and that is so called Internet telephone.

Regarding Skype network telephone, two computers installed with Skype application programs can communicate with each other through headsets and microphones by linking Internet. However, if a call is from a normal telephone number or if an incoming call is from a normal telecommunication, Skype-In or Skype-out must be used to perform subsequent service.

To satisfy demands, designing a communication system and a communicating connection method thereof to prevent the user from being harmed by electromagnetic wave and avoid problems of weaker indoor signals and higher expenses in prior arts becomes an important issue.

BRIEF SUMMARY

In view of the shortcomings of the prior art, the inventor(s) of the present invention based on years of experience in the related industry to conduct extensive researches and experiments, and finally developed a communication system and a communicating connection method thereof as a principle objective to overcome the problems of high phone expenses, stronger electromagnetic wave and weaker indoor signals.

To achieve the foregoing objective of the invention, a communication system is provided and includes a first user side, a second user side and a cloud platform. The first user side has a first identification code, a first space identification code or a combination thereof. The second user side has a second identification code, a second space identification code or a combination thereof. The cloud platform includes a cloud database and a cloud processing module. The cloud database stores the first identification code, the first space identification code or the combination thereof, or stores the second identification code, the second space identification code or the combination thereof. The cloud processing module receiving a calling request of the second identification code, the second space identification code or the combination thereof from the first user side, and matching and establishing a voice communication link between the first user side and the second user side by a VoIP (voice over Internet Protocol) technique. Wherein, the first user side transmits the first identification code, the first space identification code or the combination thereof to the cloud platform to position a location of the first user side, and transmits the calling request of the second identification code, the second space identification code or the combination thereof to the cloud platform, and the second user side transmits the second identification code, the second space identification code or the combination thereof to the cloud platform to position a location of the second user side.

Wherein, the first user side comprises a first mobile phone end or a first telephone end, and the first mobile phone end comprises the first identification code, and the first telephone end comprises the first space identification code.

Wherein, after the first user side is positioned, the cloud platform is audio-connected to the first mobile phone end, the first telephone end and the second user side to make a three-way communication.

Wherein, the first telephone end wirely or wirelessly communicates the cloud platform, and the first telephone end wirelessly communicates the first mobile phone end to synchronously transmit the first space identification code of the first telephone end and the first identification code of the first mobile phone end to the cloud platform.

Wherein, the second user side comprises a second mobile phone end or a second telephone end, and the second mobile phone end comprises the second identification code, and the second telephone end comprises the second space identification code.

Wherein, after the first user side is positioned, the cloud platform is audio-connected to a first mobile phone end, a first telephone end and the second user side, the second mobile phone end to make a four-way communication.

Wherein, the first identification code or the second identification code is a phone number or an IPv6 address capable of identifying an identity.

Wherein, the first space identification code or the second space identification code is a phone number or an IPv6 address capable of identifying a space location.

Wherein, the first identification code and the first space identification code are an identification code of the IPv6 address, and the first user side detects the identification code capable of identifying a space location through the identification code capable of identifying an identity to position a location of the first user side, and the first user side automatically notifies that the cloud platform is completed with positioning.

Wherein, the second identification code or the second space identification code are an identification code of the IPv6 address, and the second user side detects the identification code capable of identifying a space location through the identification code capable of identifying the identity to position a location of the second user side, and the second user side automatically notifies that the cloud platform is completed with positioning.

To achieve the objective of the invention, a communicating connection method is further provided and applied to a communication system. The communication system includes a first user side, a second user side and a cloud platform. The communicating connection method includes the following steps: utilizing a cloud database of the cloud platform to store a first identification code, a first space identification code or a combination thereof, or store a second identification code, a second space identification code or a combination thereof; utilizing the first user side to transmit the first identification code, the first space identification code or the combination thereof to the cloud platform to position a location of the first user side; transmitting a calling request of the second identification code, the second space identification code or the combination thereof to the cloud platform through the first user side; receiving the calling request of the second identification code, the second space identification code or the combination thereof through a cloud processing module of the cloud platform; transmitting the second identification code, the second space identification code or the combination thereof to the cloud platform through the second user side, thereby positioning a location of the second user side; and utilizing the cloud processing module to match and establish a voice communication link between the first user side and the second user side by a VoIP (Voice over Internet Protocol) technique.

The communication system and the communicating connection method thereof of the invention can overcome problems of high phone expenses, stronger electromagnetic wave and weaker indoor signals. Simultaneously, the invention can prevent the users from being endangered by electromagnetic wave and make a clear call at anywhere and provide a function of dialing numbers on the mobile phone held by the user real-time and still retain the privacy of the user. The called end may not obtain the location of the calling end as the user. The invention has mobility and widespread and can be quickly disposed to provide the user in overseas and can also be applied in the whole world, not limiting in any individual country or area.

DETAILED DESCRIPTION

The foregoing and other technical characteristics of the present invention will become apparent with the detailed description of the preferred embodiments and the illustration of the related drawings.

Figure 1:
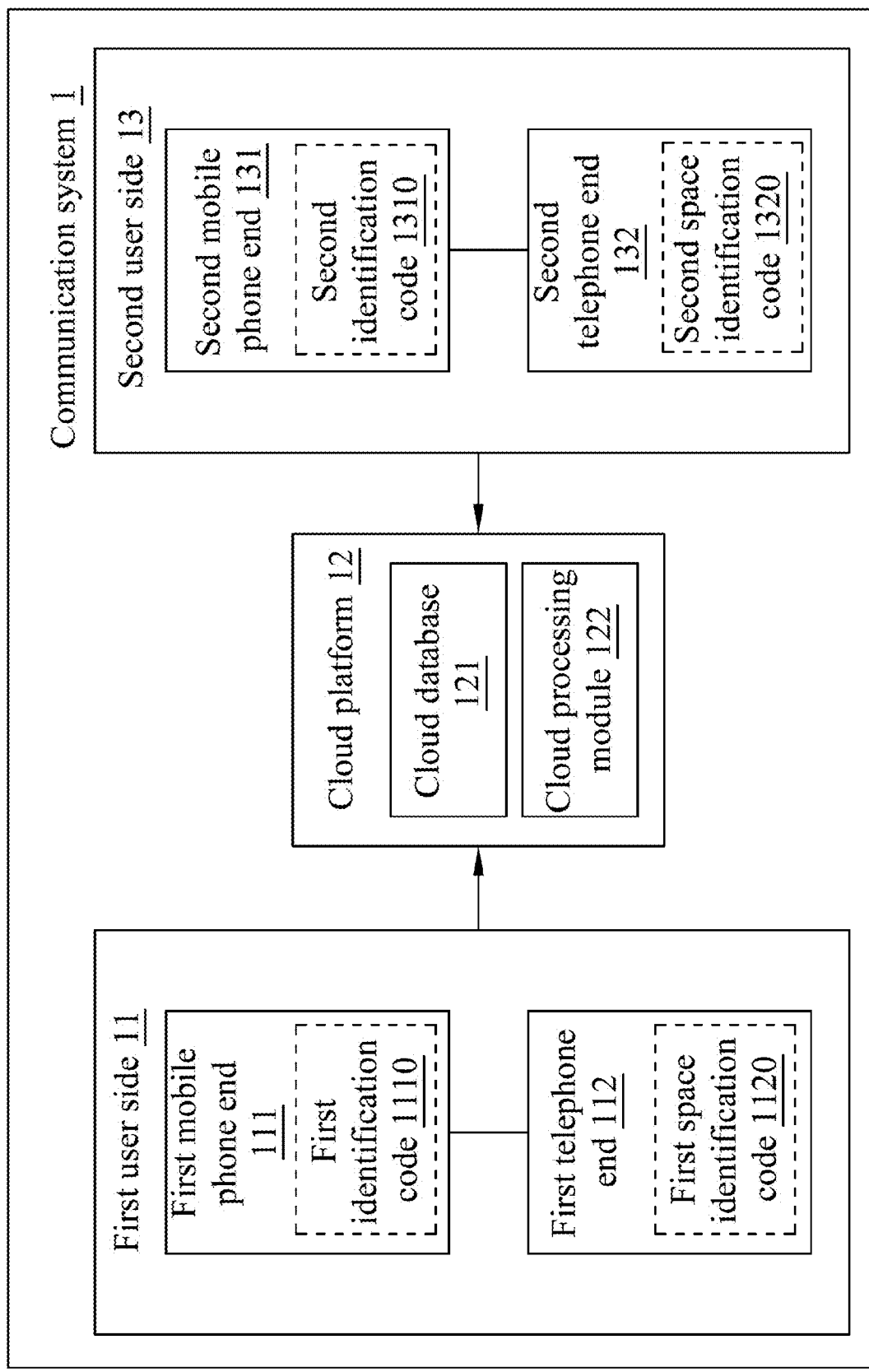
FIG. 1 is a block diagram of a communication system according to the invention.

With reference to FIG. 1 for a block diagram of a communication system according to the invention is depicted. As shown in the figure, the communication system 1 of the invention comprises a first user side 11, a second user side 13 and a cloud platform 12. The first user side 11 can include a first mobile phone end 111, a first telephone end 112 or a combination thereof. The first mobile phone end 111 can have a first identification code 1110. The first telephone end 112 can have a first space identification code 1120. The second user side 13 can include a second mobile phone end 131, a second telephone end 132 or a combination thereof. The second mobile phone end 131 has a second identification code 1310. The second telephone end 132 has a second space identification code 1320. The cloud platform 12 can include a cloud database 121 and a cloud processing module 122. The cloud database 121 is used for storing the first identification code 1110, the first space identification code 1120 or a combination thereof, or storing the second identification code 1310, the second space identification code 1320 or a combination thereof. It should be noted that the cloud database 121 can, but not limited to, simultaneously store multiple sets of identity identification codes, the space identification code or a forgoing combination. The cloud processing module 122 can receive a calling request of the second identification code 1310, the second space identification code 1320 or the combination thereof, from the first user side, and matches and establishes a voice communication link between the first user side 11 and the second user side 13.

The first user side 11 can wirely or wirelessly communicate with the cloud platform 12, and the first telephone end 112 is wirelessly connected to the first mobile phone end 111 to synchronously transmit the first space identification code 1120 of the first telephone end 112 and the first identification code 1110 of the first mobile phone end 111 to the cloud platform 12. Simultaneously, the first user side 11 transmits the first identification code 1110, the first space identification code 1120 or the combination thereof to the cloud platform 12, thereby positioning the location of the first user side 11. The second user side 13 also transmits the second identification code 1310, the second space identification code 1320 and the combination thereof to the cloud platform 12 to position the location of the second user side 13. Moreover, in order to allow the first user side 11 communicating with the second user side 13, the first user side 11 can transmit the calling request of the second identification code 1310, the second space identification code 1320 or the combination thereof to the cloud platform 12.

In another word, with the communication system 1 of the invention, after positioning the first user side 11, the cloud platform 12 is audio-connected to the first mobile phone end 111, the first telephone end 112 and the second user side 13 to achieve three-way communication. Alternatively, after positioning the first user side 11, the cloud platform 12 is audio-connected to the first mobile phone end 111, the first telephone end 112 and the second mobile phone end 131, the second telephone end 132 to achieve a four-way communication. To further understand the technical feature of the invention, two-way, three-way and four-way communication are, but not limited to, taken as an embodiment, and ordinary skill in the art can easily complete the conference call system through the communication system of the invention.

Figure 2:
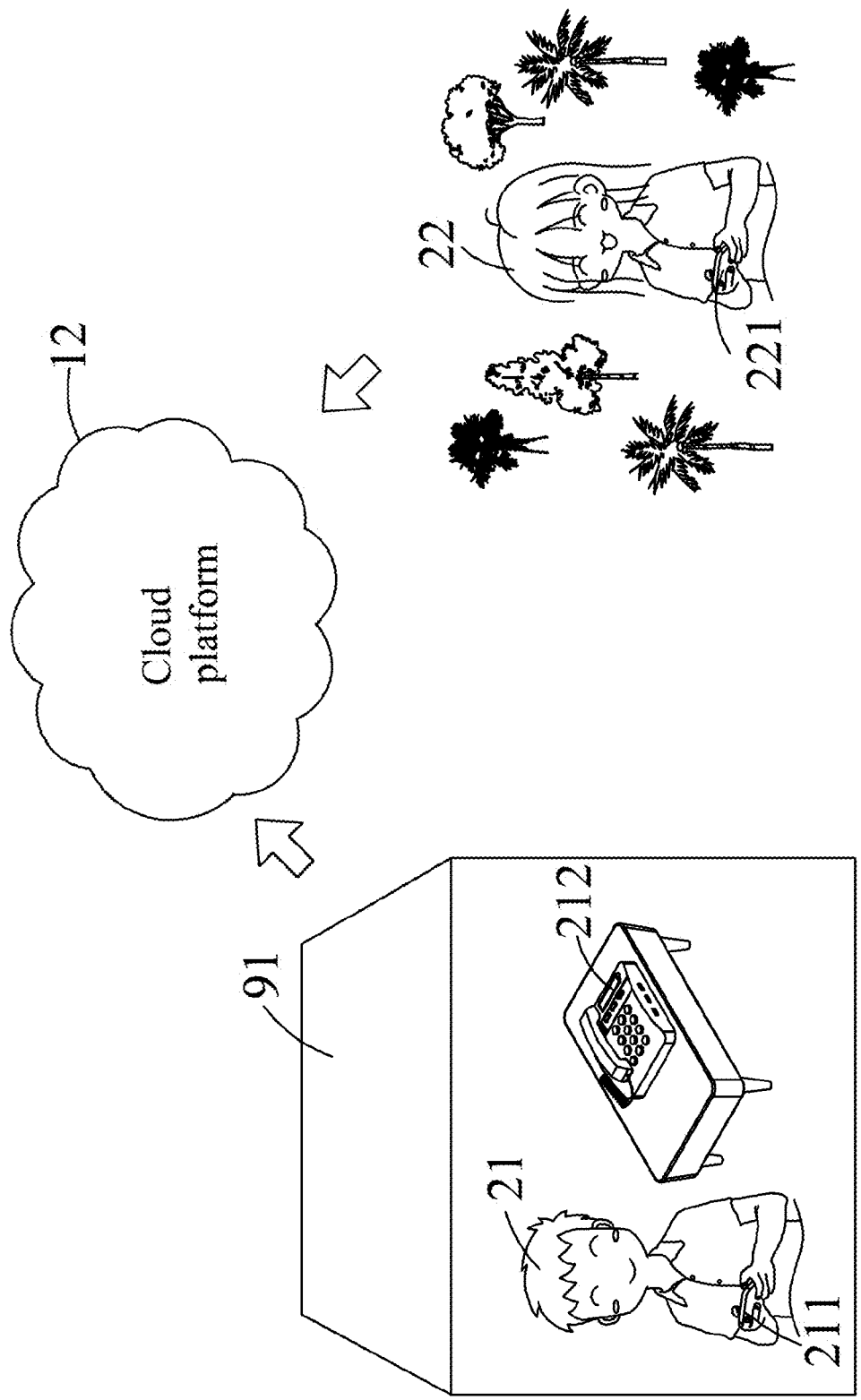
FIG. 2 is a schematic diagram of a communication system according to a first embodiment of the invention.

With reference to FIG. 2 for a schematic diagram of a communication according to a first embodiment of the invention is depicted. As shown in the figure, a user I 21 has a mobile phone 211 having an internet protocol version 6 (IPv6) address to identify identities, but it is not limited to the IPv6 address. Simultaneously, a telephone 212 is disposed in a home 91 of the user I 21. The telephone 212 also has an IPv6 address capable of identifying space location. The user II 22 also has a mobile phone 221 and a set of phone number. The wireless communication system in the mobile phone 22 of the user II 22 can, but not limited to, be a Global System for Mobile Communications (GSM), a Code Division Multiple Access (CDMA) or a Personal Handy-phone System (PHS).

When the user I 21 returns to the home 91, the user I 21 detects the IPv6 address capable of identifying space location in the telephone 212 at home 91 through the IPv6 address capable of identifying identity. Therefore, the location of the user I 21 can be confirmed at home 91. Simultaneously, the mobile phone 211 of the user I 21 can transmit the IPv6 address capable of identifying the identity to the cloud platform 12. The telephone 212 of the user I 21 can transmit the IPv6 address capable of identifying the space identification to the cloud platform 12 to automatically notify the cloud platform 12 that the user I 21 has been completed with positioning.

When the user I 21 would like to make a call with the user II 22, the mobile phone 211 of the user I 21 can be inputted with a phone number of the user II 22 and dialed to the cloud platform 12. The mobile phone 221 of the user II 22 is switched on through a normal telecommunication system and the cloud platform 12 is also established to audio-connect the telephone 212 at home 91 of the user I 21 to make a two-way communication.

It should be noted that when the user I 21 uses the mobile phone 211 to dial the mobile phone 221 of the user II, the telephone 212 at home 91 of the user I 21 also rings. The user I 21 can freely select the mobile phone 211 or the telephone 212 to make a call with the user II 22 to increase the convenience.

According to the first embodiment, the invention further provides a second embodiment as an example.

Figure 3:
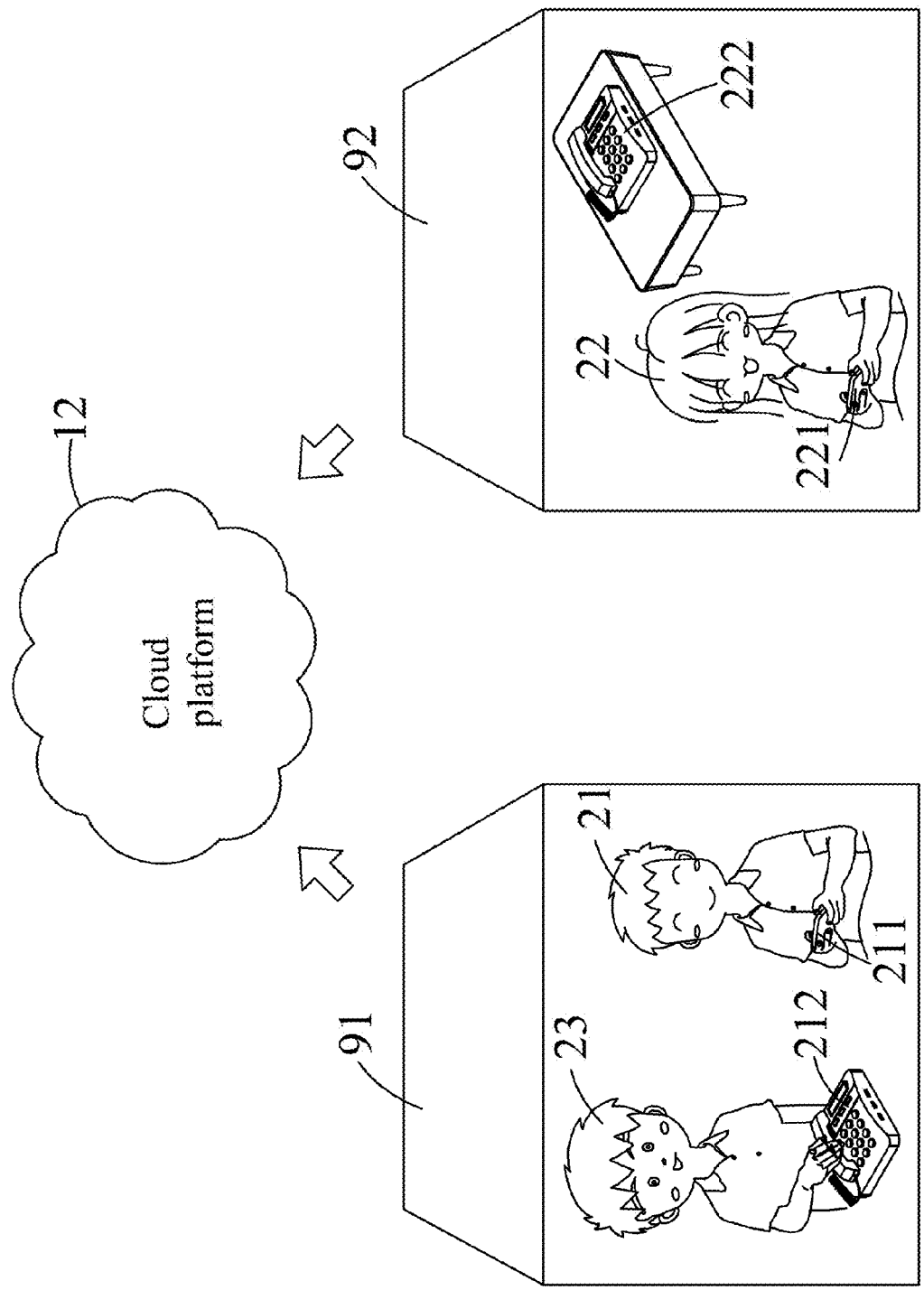
FIG. 3 is a first schematic diagram of a communication system according to a second embodiment of the invention.
Figure 4:
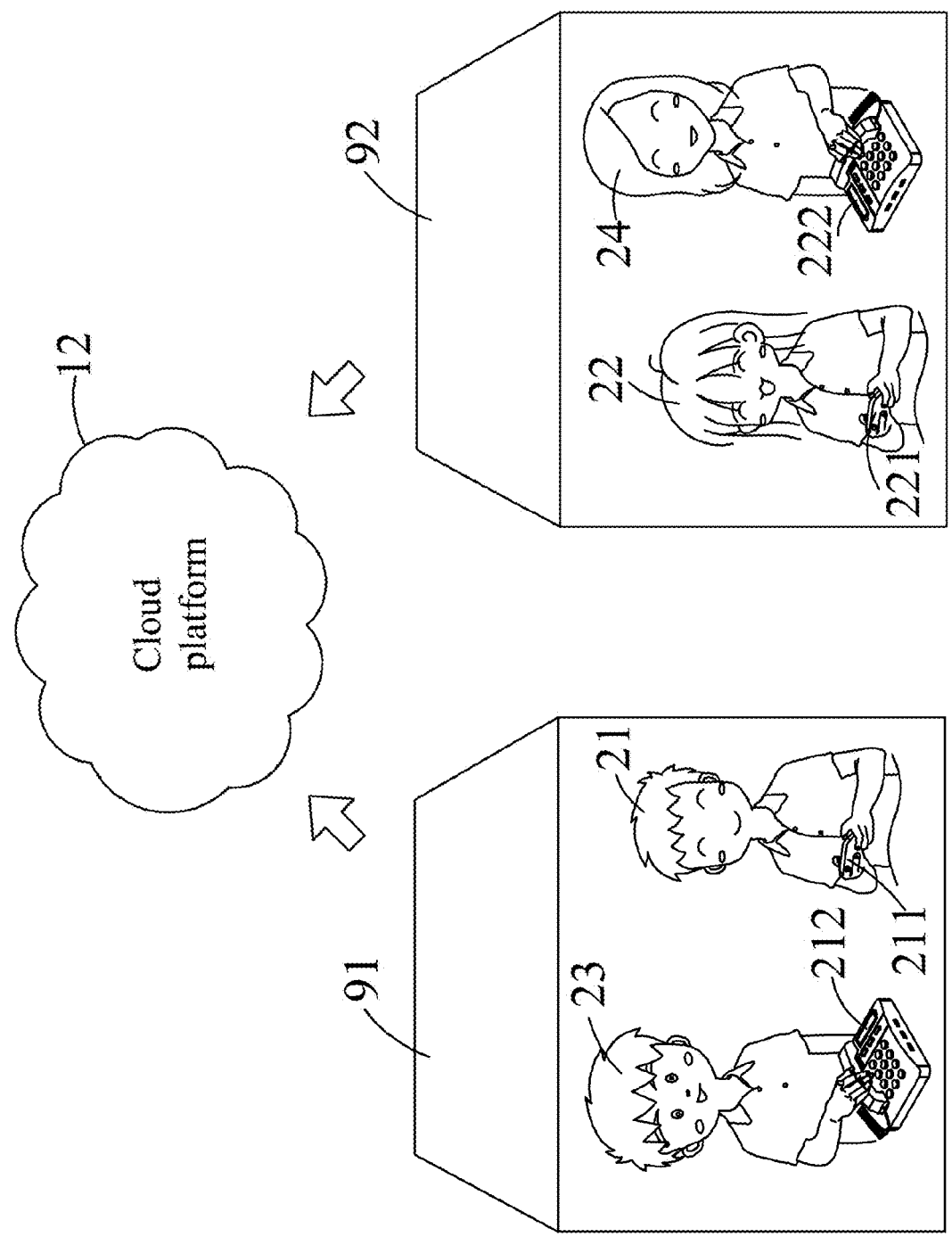
FIG. 4 is a second schematic diagram of a communication system according to a second embodiment of the invention.

With reference to FIG. 3 and FIG. 4 for a first schematic diagram and a second schematic diagram according to a first embodiment of the invention are depicted. The user I 21 has a mobile phone 211 having the IPv6 address. A telephone 212 is disposed at home 91 of the user I 21. The telephone 212 can, but not limited to, also have the IPv6 address capable of identifying space location. The user II 22 also has a mobile phone 221 having the IPv6 address. A telephone 222 is disposed at home 92 of the user II 22. The telephone also has the IPv6 address capable of identifying the space location.

When the user I 21 returns to home 91, the user I 21 can detect the IPv6 address, which can identify the space location, in the telephone 212 at home 91 through the IPv6 address capable of identifying the identity. The location of the user I 21 can be confirmed at home 91. Simultaneously, the mobile phone 211 of the user I 21 can transmit the IPv6 address capable of identifying the identity to the cloud platform 12. The telephone 212 of the user I 21 can transmit the IPv6 address capable of identifying the space location to the cloud platform 12 to automatically notify the cloud platform 12 that the user I 21 has been completed with positioning.

When the user II 22 is at home 92, the user II 22 can detect the IPv6 address, which can identify the space location, in the telephone 22 at home 92 through the IPv6 address capable of identifying the identity. The location of the user II 22 can be confirmed at home 92. The mobile phone 221 of the user II 22 can transmit the IPv6 address capable of identifying the identity to the cloud platform 12. The telephone 222 at home 92 of the user II 22 can transmit the IPv6 address capable of identifying the space location to the cloud platform 12 to automatically notify the cloud platform 12 that the user II 22 has been completed with positioning.

When the user I 21 would like to make a call with the user II 22, the user I 21 can transmit the IPv6 address of the user II 22 capable of identifying the identity and the IPv6 address capable of identifying the space location to the cloud platform 12. Furthermore, after the user I 21 is positioned, the cloud platform 12 can be audio-connected to the mobile phone 211 and the telephone 212 of the user I 21 and the user II 22 to make a two-way communication. The transmission manner disclosed by the invention is only an example, not a restriction. The ordinary skill in the art can easily replace with other transmission manners to incorporate with the communication system 1 of the invention.

More specifically, when the user I 21 dials the number to the user II 22, the telephone 212 at home 91 of the user I 21, the mobile phone 221 of the user II 22 and the telephone 222 at home 92 of the user II 22 are ringing simultaneously. The incoming call number can be displayed or not displayed on the mobile phone 221 of the user II 22 upon demands. As shown in FIG. 3, if a friends of the user I 21, a user III 23 would like to make a call with the user II 22, the telephone 212 at home 91 of the user I 21 can be directly taken to communicate with the user I 21, the user II 22 and the user III 23 to achieve the three-way communication.

Furthermore, as shown in FIG. 4, if a friends of the user II 22, a user IV 24 would like to participate the call, the user I 21 dials the number to the user II 22 to allow the telephone 212 at home 91 of the user I 21, the mobile phone 221 of the user II 22 and the telephone 222 at home 92 of the user II 22 simultaneously ringing. Four people take the mobile phone and the telephone to make a four-way communication.

It should be noted that when the user would like to be positioned, the application program installed in a smart phone can, but not limited to, be used to select the current location, such as home, office or meeting rooms, through a keypad or a touch panel. In addition, if the user does not use the smart phone, the user can make a free call to represent that the user is at home. If the user is in the office, the user can call another toll free number to represent that the user is in the office. Accordingly, the user can freely set manual positioning or automatic positioning based upon the functions and location of the mobile phone used by personals.

During the process of depicting the communication system 1 of the invention, a concept of communicating connection method of the communication system 1 according to the invention has been simultaneously depicted. To further understand the invention, the following flowchart is provided.

Figure 5:
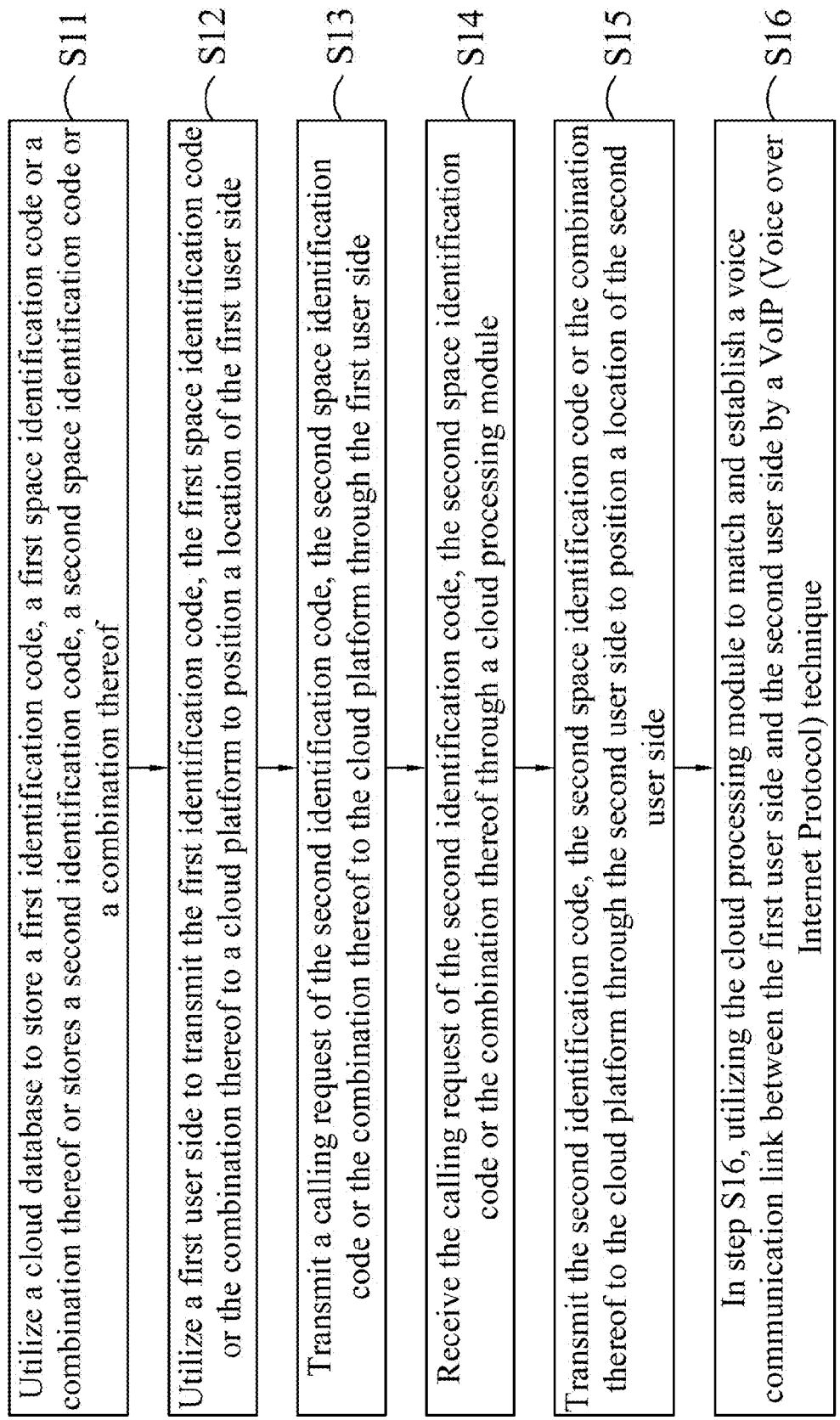
FIG. 5 is a flowchart of a communicating connection method according to the invention.

With reference to FIG. 5 for a flowchart of a communicating connection method according to the invention is depicted. The communicating connection method according to the invention is applied to a communication system. The communication system includes a first user side, a second user side and a cloud platform. The communicating connection method of the invention comprises the following steps:

In step S11, utilize a cloud database to store a first identification code, a first space identification code or a combination thereof or stores a second identification code, a second space identification code or a combination thereof.

In step S12, utilize a first user side to transmit the first identification code, the first space identification code or the combination thereof to a cloud platform to position a location of the first user side.

In step S13, transmit a calling request of the second identification code, the second space identification code or the combination thereof to the cloud platform through the first user side.

In step S14, receive the calling request of the second identification code, the second space identification code or the combination thereof through a cloud processing module.

In step S15, transmit the second identification code, the second space identification code or the combination thereof to the cloud platform through the second user side to position a location of the second user side.

In step S16, utilizing the cloud processing module to match and establish a voice communication link between the first user side and the second user side by a VoIP (Voice over Internet Protocol) technique.

The detail depiction and embodiments of the communicating connection method according to the invention have been described in the communication system of the invention, and there is no need to describe herein.

The communication system and the communicating connection method thereof according to the invention have one or more advantages as the following:

1. The communication system and the communicating connection method thereof of the invention can overcome problems of high telephone bills, stronger electromagnetic wave and weaker indoor signals in prior arts.

2. The communication system and the communicating connection method thereof of the invention can prevent the users from being endangered by electromagnetic wave and make a clear call at anywhere.

3. The communication system and the communicating connection method thereof of the invention can provide a function of dialing numbers on the mobile phone held by the user real-time and still retains the privacy of the user. The called end may not obtain the location of the calling end as the user.

4. The communication system and the communicating connection method thereof of the invention have mobility and widespread and can be quickly disposed to provide the user in overseas and can also be applied in the whole world, not limiting in any individual country or area.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A communication system comprising:
a first user side having a first identification code, a first space identification code or a combination thereof;
a second user side having a second identification code, a second space identification code or a combination thereof; and
a cloud platform comprising a cloud database and a cloud processing module, the cloud database storing the first identification code, the first space identification code or the combination thereof, or storing the second identification code, the second space identification code or the combination thereof, and the cloud processing module receiving a calling request including the second identification code, the second space identification code or the combination thereof from the first user side, and matching and establishing a voice communication link between the first user side and the second user side by a VoIP (voice over Internet Protocol) technique;
wherein the first user side comprises a first mobile phone end and a first telephone end, and the first mobile phone end comprises the first identification code, and the first telephone end comprises the first space identification code, and the first user side transmits the first identification code, the first space identification code or the combination thereof to the cloud platform to position a location of the first user side, and when the first mobile phone end transmits the calling request including the second identification code, the second space identification code or the combination thereof to the cloud platform, the cloud platform establishes a voice communication link between the first mobile phone end and the second user side, and if the cloud platform determines the first telephone end geographically near the first mobile phone end according to the first space identification code, the cloud platform automatically establishes a voice communication link between the first telephone end and the second user side, wherein the first mobile phone end has stronger electromagnetic waves or higher phone expenses than the first telephone end.

2. The communication system as recited in claim 1, wherein after the first user side is positioned, the cloud platform supports make a three-way communication among a user, phones, and ends.

3. The communication system as recited in claim 1, wherein the first telephone end wirely or wirelessly communicates with the cloud platform, and the first telephone end wirelessly communicates with the first mobile phone end to simultaneously transmit the first space identification code of the first telephone end and the first identification code of the first mobile phone end to the cloud platform.

4. The communication system as recited in claim 1, wherein the second user side comprises a second mobile phone end or a second telephone end, and the second mobile phone end comprises the second identification code, and the second telephone end comprises the second space identification code; and wherein the second user side transmits the second identification code, the second space identification code, or the combination thereof to the cloud platform to position a location of the second user side.

5. The communication system as recited in claim 4, wherein after the first user side is positioned, the cloud platform has a hardwired connection to support four parties including a first mobile phone end of the first user side, a first telephone end, the second user side, and the second mobile phone end to make a four-way communication.

6. The communication system as recited in claim 1, wherein the first identification code or the second identification code is a phone number or an IPv6 (Internet Protocol version 6) address capable of identifying an identity.

7. The communication system as recited in claim 1, wherein the first space identification code or the second space identification code is a phone number or an IPv6 (Internet Protocol version 6) address capable of identifying a space location.

8. The communication system as recited in claim 1, wherein the first identification code and the first space identification code are an identification code of an IPv6 address, and the first user side detects the identification code capable of identifying a space location through the identification code capable of identifying an identity to position a location of the first user side, and the first user side automatically notifies that the cloud platform is completed with positioning.

9. The communication system as recited in claim 1, wherein the second identification code or the second space identification code are an identification code of an IPv6 address, and the second user side detects the identification code capable of identifying a space location through the identification code capable of identifying an identity to position a location of the second user side, and the second user side automatically notifies that the cloud platform is completed with positioning.

10. A communicating connection method applied to a communication system, the communication system comprising a first user side, a second user side and a cloud platform, the communicating connection method comprising:
utilizing a cloud database of the cloud platform to store a first identification code, a first space identification code or a combination thereof, or store a second identification code, a second space identification code or a combination thereof;
utilizing the first user side to transmit the first identification code, the first space identification code or the combination thereof to the cloud platform to position a location of the first user side;
transmitting a calling request including the second identification code, the second space identification code or the combination thereof to the cloud platform from the first user side;
receiving the calling request including the second identification code, the second space identification code or the combination thereof through a cloud processing module of the cloud platform; and
utilizing the cloud processing module to match and establish a voice communication link between the first user side and the second user side by a VoIP (Voice over Internet Protocol) technique;
wherein the first user side comprises a first mobile phone end and a first telephone end, and the first mobile phone end comprises the first identification code, and the first telephone end comprises the first space identification code, and when the first mobile phone end transmits the calling request including the second identification code, the second space identification code or the combination thereof to the cloud platform, the cloud platform establishes a voice communication link between the first mobile phone end and the second user side, and if the cloud platform determines the first telephone end geographically near the first mobile phone end according to the first space identification code, the cloud platform automatically establishes a voice communication link between the first telephone end and the second user side, wherein the first mobile phone end has stronger electromagnetic waves or higher phone expenses than the first telephone end.

11. The communicating connection method as recited in claim 10, further comprising:
positioning the location of the first user side;
connecting, by a hardwired connection, the first mobile phone end, the first telephone end, and the second user side through the cloud platform, and making a three-way communication among the first mobile phone end, the first telephone end, and the second user side.

12. The communicating connection method as recited in claim 10, further comprising:
wirely or wirelessly communicating with the first telephone end and the cloud platform; and
wirelessly communicating with the first telephone end and the first mobile phone end to simultaneously transmit the first space identification code of the first telephone end and the first identification code of the first mobile phone end to the cloud platform.

13. The communicating connection method as recited in claim 10, wherein the second user end comprises a second mobile phone end or a second telephone end, and the second mobile phone end comprises the second identification code, and the second telephone end comprises the second space identification code.

14. The communicating connection method as recited in claim 13, further comprising:
positioning the location of the first user side; and
connecting, by a hardwired connection, four parties including the first mobile phone end of the first user side, a first telephone end, the second mobile phone end, and the second telephone end through the cloud platform, thereby making a four-way communication.

15. The communicating connection method as recited in claim 10, wherein the first identification code or the second identification code is a phone number or an IPv6 (Internet Protocol version 6) address capable of identifying an identity.

16. The communicating connection method as recited in claim 10, wherein the first space identification code or the second space identification code is a phone number or an IPv6 (Internet Protocol version 6) address capable of identifying a space location.

17. The communicating connection method as recited in claim 10, further comprising:
providing the first user side to utilize an identification code of an IPv6 (Internet Protocol version 6) address capable of identifying an identity to detect an identification code of an IPv6 address capable of identifying a space location, thereby positioning a location of the first user side; and
utilizing the first user side to automatically notify the cloud platform to complete a positioning.

18. The communicating connection method as recited in claim 10, further comprising:
providing the second user side to utilize an identification code of an IPv6 address capable of identifying an identity to detect an identification code of an IPv6 address capable of identifying a space location, thereby positioning the location of the second user side; and
utilizing the second user side to automatically notify the cloud platform to complete a positioning.

* * * * *